(No Model.)

N. AMES.
UTENSIL FOR COOKING BEANS.

No. 507,199. Patented Oct. 24, 1893.

WITNESSES
J. N. Hartnett.
B. W. Williams.

INVENTOR
Nathaniel Ames,
By his Att'y
Henry W. Williams

UNITED STATES PATENT OFFICE.

NATHANIEL AMES, OF EAST MADISON, MAINE, ASSIGNOR OF ONE-HALF TO ERNEST M. AMES, OF SAME PLACE.

UTENSIL FOR COOKING BEANS.

SPECIFICATION forming part of Letters Patent No. 507,199, dated October 24, 1893.

Application filed June 8, 1893. Serial No. 476,990. (No model.)

*To all whom it may concern:*

Be it known that I, NATHANIEL AMES, a citizen of the United States, residing at East Madison, in the county of Somerset and State of Maine, have invented a new and Improved Utensil for Cooking Beans, of which the following is a specification.

This utensil is intended to take the place of the ordinary bean-pot now in common use. In cooking beans in the ordinary manner, i. e., in an open bean-pot, the difficulty has always been that the beans were liable to dry and become burned at the top or surface, and in order to as far as possible prevent this from occurring, it has been found necessary to pour in water repeatedly while the cooking process is going on. By means of my invention, the water need be poured in but once, viz., when the beans are put into the vessel, and the beans at the top will not become dry or burned, but the entire mass will be cooked evenly.

Figure 1:
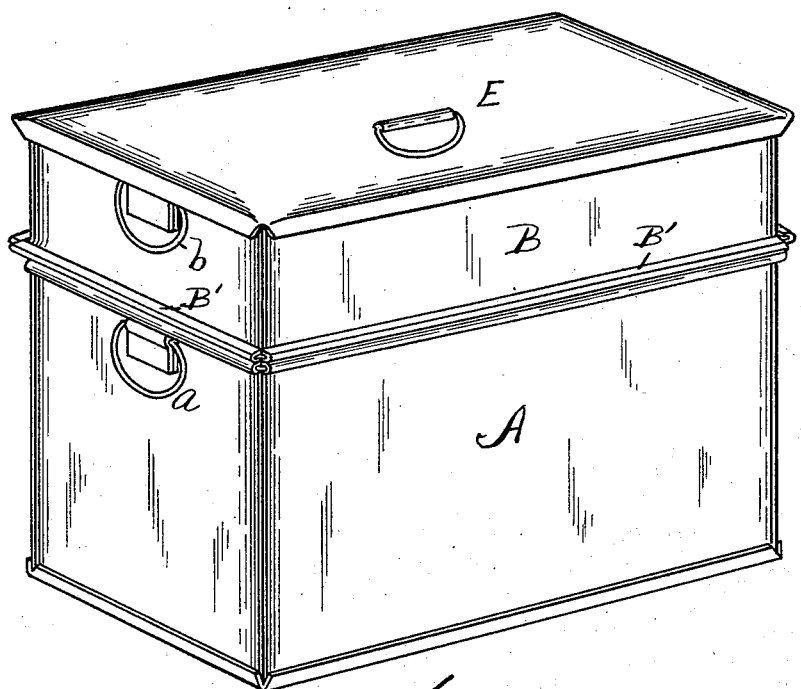
Figure 2:
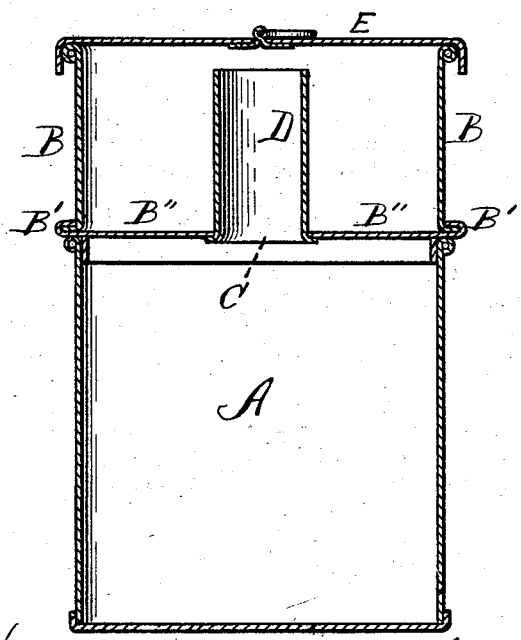

In the accompanying drawings, in which similar letters of reference indicate like parts, Figure 1 is a perspective view of my improved utensil for cooking beans. Fig. 2 is a cross vertical section of the same.

A is the lower portion or body of the utensil, made of tin, iron, or other suitable material, and of rectangular or other suitable shape. This is the portion in which the beans are placed. Suitable ears $a$ are provided for convenience in lifting it. The portion A has no cover, but is substantially a deep tray, and on its upper edges a tray B sets by means of horizontal flanges B', said tray fitting closely into the lower portion A and being provided with suitable ears $b$. The bottom B'' of this tray is provided with a central hole C, from which a vertical funnel D extends upward to within a short distance of the top. The tray B is provided with a cover E. After the beans have been placed in the vessel A and a suitable amount of water poured in, the tray B is placed in position, and, preferably, a little water poured into it. The cover E is then placed in position. By means of the funnel D, steam can pass from the lower vessel into the upper or back again, but no dry air comes in contact with the beans as the air in the upper tray is kept moist by the water therein. The result is that the beans do not become dry or burned on the top, and cook evenly throughout the mass. No additional water is required, the water placed in at first being sufficient.

Having thus fully described my invention, what I claim, and desire to secure by Letters Patent, is—

The herein described improved utensil for cooking beans, consisting of the lower vessel or deep tray A, the upper covered vessel or tray B setting on or fitting into said lower vessel by means of the flange B', the bottom of said upper vessel being provided with the hole C, and the funnel D extending up from said hole and with its top opening into said upper vessel, substantially as set forth.

NATHANIEL AMES.

Witnesses:
GEO. G. WEEKS,
J. H. BLANCHARD.